Patented Nov. 22, 1938

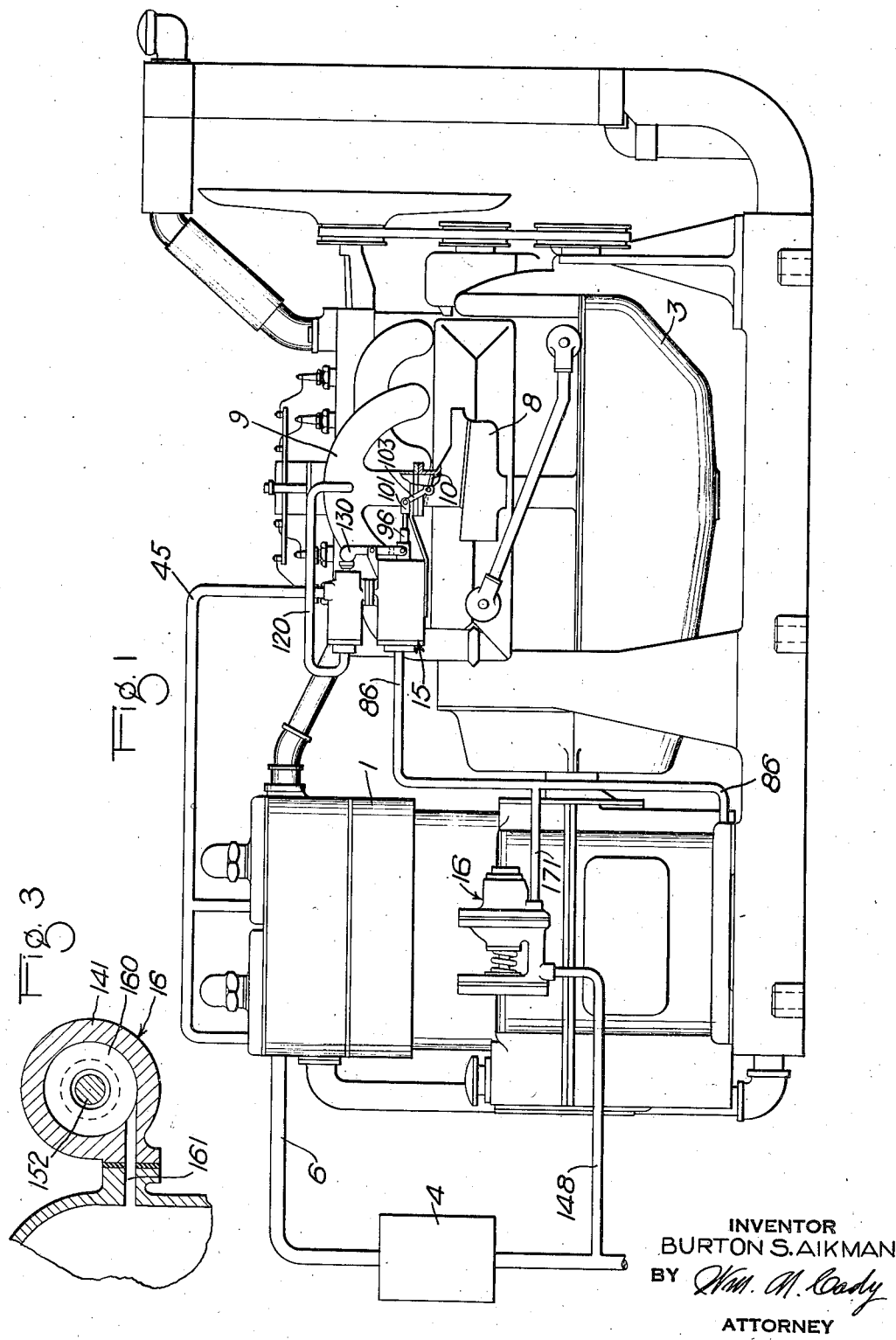

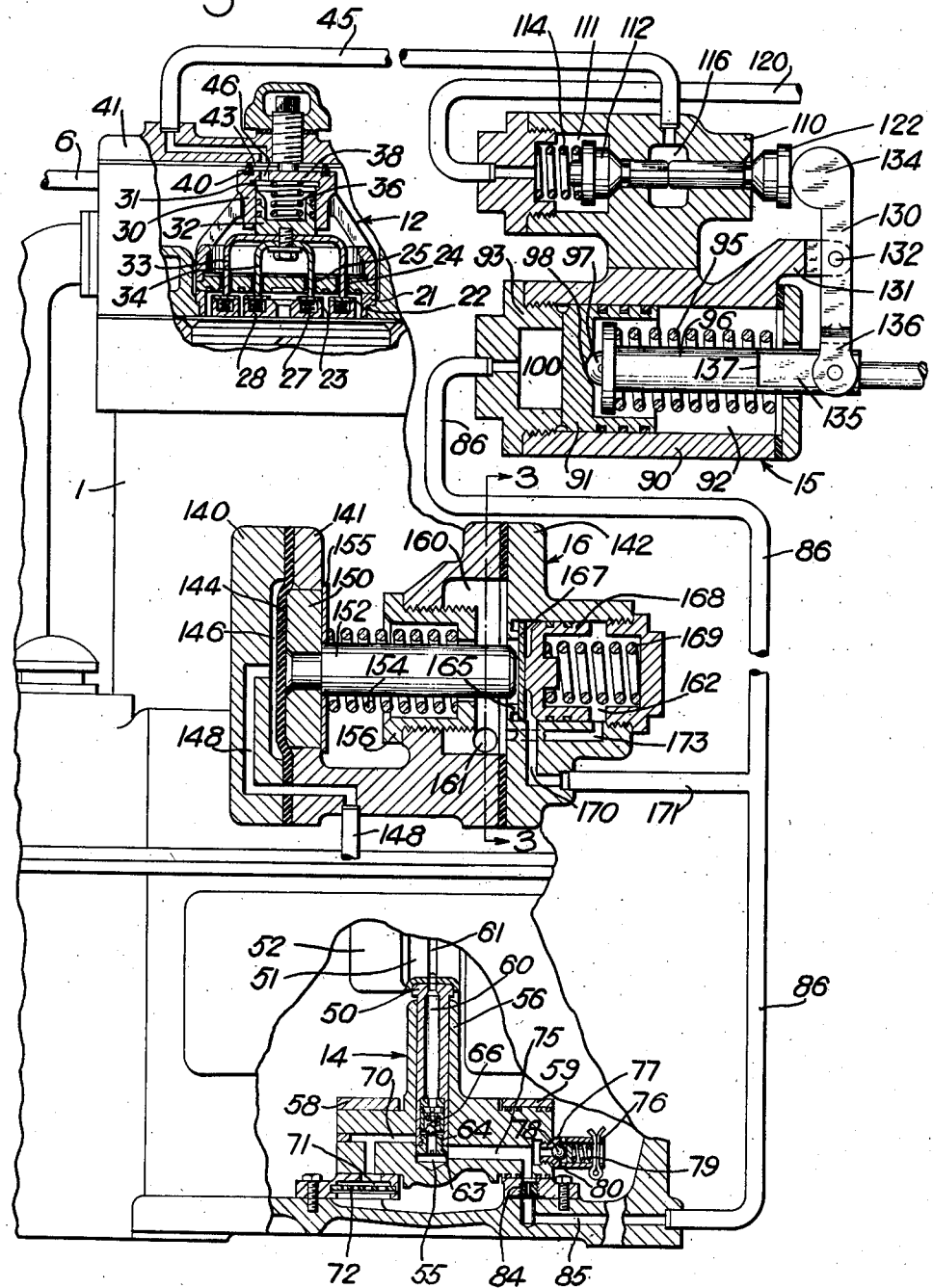

2,137,219

UNITED STATES PATENT OFFICE 2,137,219

COMPRESSOR CONTROL MECHANISM

Burton S. Aikman, Wilkinsburg, Pa., assignor to The Westinghouse Air Brake Company, Wilmerding, Pa., a corporation of Pennsylvania Application August 22, 1935, Serial No. 37,380

13 Claims. (Cl. 230—4)

This invention relates to a control system for a fluid compressor and for an internal combustion engine for driving the said compressor.

It is an object of this invention to provide a fluid compressor having unloading means associated therewith and normally operative to maintain the compressor unloaded, together with means subject to and operated upon a predetermined reduction in the pressure of the fluid in the fuel inlet passage of the internal combustion engine employed to drive the compressor to actuate the unloading means to effect loading of the compressor.

Another object of the invention is to provide a compressor of the type referred to and having means responsive to the pressure of the fluid compressed by the compressor and controlling communication between the engine inlet passage and the means controlling the compressor unloading means.

A further object of the invention is to provide a compressor of the type referred to and having means responsive to the speed of the compressor and controlling communication between the engine inlet passage and the means controlling the compressor unloading means.

Another object of the invention is to provide a control system for a compressor having unloading means associated therewith and normally operative to maintain the compressor unloaded, and having means subject to and operated upon a predetermined reduction in the pressure of the fluid in the fuel inlet passage of the internal combustion engine employed to drive the compressor to actuate the unloading means to effect loading of the compressor, the fuel inlet passage having a throttle valve controlling the flow of fluid therethrough, the throttle valve being movable between an engine idling position and an engine load position, the control system being responsive to the pressure of the fluid compressed by the compressor, and being opreated upon a predetermined reduction in said pressure to move the throttle valve from the idling position to the load position, and to establish communication between the fuel inlet passage and the means controlling the unloading means so as to effect loading of the compressor.

A further object of the invention is to provide a control system of the type referred to and in which the throttle valve is gradually moved from the idling position to the load position, and in which the unloading control means is not operated to effect loading of the compressor until the throttle valve has been moved a predetermined distance from the idling position towards the load position.

Another object of the invention is to provide an improved control system for a fluid compressor and for an internal engine employed to drive the compressor.

Other objects of the invention and features of novelty will be apparent from the following description taken in connection with the accompanying drawings in which Fig. 1 is an elevational view of a compressor and internal combustion engine for driving the compressor together with the control system provided by my invention.

Fig. 2 is a diagrammatic view, largely in section, of the control system provided by my invention, and Fig. 3 is a sectional view taken substantially along the line 3—3 of Fig. 2.

Referring to the drawings a fluid compressor is indicated generally by the reference numeral 1, and is driven by an internal combustion engine, which is indicated generally by the reference character 3, and which may be of any suitable, well-known construction.

The compressor 1 compresses fluid into a reservoir 4 by way of a discharge pipe 6, while the engine 3 is supplied with fuel from the carburetor 8 by way of a fuel inlet passage 9, which has a throttle valve 10 interposed therein and which controls the flow of fluid therethrough.

The compressor 1 has associated with each cylinder an inlet valve assembly, indicated generally by the reference numeral 12, and which controls a passage through which fluid is supplied to the cylinder. The inlet valve assembly 12 has associated therewith means normally operative to hold the valve open and to thereby effect unloading of the compressor, this means being operated by the partial vacuum created in the fuel inlet passage of the engine when the engine is running to permit the inlet valve to close and thus effect loading of the compressor.

The control system provided by this invention provides means to control the communication between the unloading control means and the engine inlet passage, and also to control the throttle valve in the inlet passage in response to variations in the pressure of the fluid compressed by the compressor.

The control system provided by this invention comprises a control device indicated generally by the reference numeral 15 and which is operated by lubricant under pressure supplied thereto by the pump 14 of the compressor lubricating system. The control system includes, in addition, a pressure responsive device 16 which is subject to the pressure of the fluid compressed by the compressor and which controls the supply of lubricant under pressure from the pump 14 to the control device 15.

The inlet valve assembly 12 comprises a valve seat 21, which extends across a passage leading to the cylinder of the compressor, and has associated therewith a pair of annular rings 22 and 23, and which are adapted to engage the seat 21 to close the passages 24 and 25 which extend through the valve seat. The annular rings 22 and 23 are urged into engagement with the seat 21 by means of springs 27 which extend between the annular rings 22 and 23 and cage 28.

The inlet valve assembly 12 includes, in addition, a body 30 having a piston chamber 31 formed therein in which is mounted a piston 32 which has secured to the lower face thereof fingers 33 and 34 which extend into the openings 24 and 25, and which are adapted to engage the annular rings 22 and 23 to move these downwardly against the springs 27. A spring 36 is positioned in the piston chamber 31 and extends between the piston 32 and the upper wall 38 of the piston chamber 31, and normally urges the piston 32 downwardly so that the fingers 33 and 34 force the annular rings 22 and 23 away from the seat 21, thus maintaining the compressor unloaded.

The upper face of the end wall 38 is provided with an annular groove in which is fitted an annular sealing gasket 40, which is engaged by the lower face of the cover plate 41 so as to form a chamber 43 which is connected with the control device 15 by way of a passage and pipe 45. The upper wall 38 of the chamber 31 has a passage 46 extending therethrough and communicating with the chamber 43 and with the piston chamber 31.

The compressor is provided with a pressure lubricating system which supplies lubricant under pressure to different parts of the compressor, and as shown in the drawings, this system comprises a pump, indicated generally by the reference character 14, and which is adapted to draw lubricant from the lower or crank case portion of the compressor, which serves as an oil reservoir and forces this lubricant through suitable passages to the portions of the compressor to be lubricated.

As shown in the drawings the pump 14 comprises a piston 50, which is journaled on an eccentric 51 formed on the compressor crank shaft 52. The piston 50 is reciprocable in a piston chamber 55 formed in the member 56 which is pivotally mounted on the compressor body by means of brackets 58 and 59. The piston 50 has a passage 60 extending therethrough and registering with an annular groove 61 formed in the eccentric 51 on the crank shaft 52, which in turn communicates with passages, not shown, drilled in the crank shaft and leading to portions of the crank shaft to be lubricated.

The lower end of the passage 60 in the piston 50 is controlled by a check valve device which, as shown in the drawings, comprises a seat member 63 which has a ball valve element 64 engageable therewith and normally urged into engagement with the seat on the member 63 by means of a spring 66.

The chamber 55 has an inlet passage 70 communicating therewith at a point spaced from the end thereof and leading from a chamber 71 formed in the bracket 58, this chamber having a screen 72 extending there across and through which is drawn the lubricant which flows to the pump.

The chamber 55 has a discharge passage 75 leading therefrom at a point adjacent the end thereof and communicating with a pressure release valve device indicated generally by the reference numeral 76 and comprising a valve seat member 77 having a ball valve element 78 normally held in engagement therewith by means of a spring 79. When the pressure of the lubricant pumped by the pump exceeds a predetermined value, the ball valve element 78 is forced away from the seat on the member 77, thereby permitting fluid to escape by way of the passages 80 thus limiting the pressure which can be built up in the lubricating system.

The passage 75 also has a passage 85 communicating therewith through a choke or restricted portion 84 which limits the rate of flow of fluid from the passage 75 to the passage 85. The passage 85 has connected thereto a pipe 86, which communicates with the control device 15 and the fluid pressure responsive device 16.

The control device 15 comprises a body section 90 having a bore 92 therein in which is mounted a piston 91 which is normally urged into engagement with a plug or cap member 93 by means of a spring 95 acting through a plunger 96, which is provided with a rounded end portion 97 which extends into a conical recess 98 in the face of the piston 91.

The chamber 100 on the left hand side of the piston 91 is connected by way of the pipe 86 with the pump 14 of the compressor lubricating system.

The other end of the plunger 96 is connected by means of a yoke 101 with a lever 103, which controls the throttle valve 10 in the fuel inlet passage 9 of the engine 3, as is best shown in Fig. 1 of the drawings.

The control device 15 also includes a body section 110 which has formed therein a valve chamber 111 in which is mounted a valve element 112 having a fluted stem which is positioned in a bore in the body 110, the valve element 112 being urged into engagement with a seat surrounding said bore by means of a spring 114 so as to control communication between the valve chamber 111 and a chamber 116, which is connected by way of the pipe 45 with the unloading means associated with the compressor cylinder. The chamber 111 is connected with the engine inlet passage 9 by way of a pipe 120.

The casing section 110 has, in addition, a valve element 122 associated therewith and having a fluted stem which is mounted in a bore in the body section 110 which communicates with the chamber 116 and with the atmosphere. The valve element 122 is adapted to engage a seat surrounding the bore in which the stem of the valve element is positioned so as to control communication between the atmosphere and the chamber 116, while the end of the stem of the valve element 122 is adapted to engage the end of the stem of the valve element 112.

The valve elements 112 and 122 are operated by means of a lever 130, which is pivotally supported by means of a pin 132 on a bracket 131 associated with the body section 90, and has a rounded end portion 134 which is adapted to engage the face of the valve element 122.

The other end 136 of the lever 132 is forked so as to extend around the end of the plunger 96 which has flat faces 135 formed thereon and terminating in a shoulder 137, which is adapted to engage the forked end portion 136 of the lever 130 after a predetermined amount of movement of the plunger 96 to the right, as viewed in Fig. 2 of the drawings, and thereby move the valve element 122 into engagement with its seat and move the valve element 112 away from its seat against the spring 114.

The fluid pressure responsive device 16 comprises a plurality of casing sections including the sections 140, 141 and 142, and is preferably mounted on the side of the crank case portion of the body of the compressor 1.

A movable abutment in the form of a diaphragm 144 which is clamped between the casing sections 140 and 141 is provided, and is subject on one side to the pressure of the fluid in a chamber 146, which is constantly connected to the reservoir 4 by way of a passage and pipe 148.

The diaphragm 144 is engaged on the other side by a plunger 150 which is mounted in a bore in the casing section 141 and which has secured thereto a stem 152. The plunger 150 is subject to the pressure of a spring 154 which presses against a plate 155, fitted against one face of the plunger 150 and which is somewhat larger in diameter than the plunger 150 so as to engage the face of the casing section 141 and thereby limit movement of the plunger 150 to the left by means of the spring 154. The other end of the spring engages an adjustable bushing 156 which has screw-threaded engagement with the casing section 141, and by means of which the tension on the spring 154 may be adjustably varied.

The casing section 141 has a chamber 160 formed therein which is constantly connected to the compressor crank case by way of a passage 161, as is best shown in Fig. 3 of the drawings.

The casing section 142 has a bore 162 therein and has a seat rib 165 which surrounds a passage leading from the bore 162 to the chamber 160. A valve disc 167 is provided and is adapted to seat against the seat rib 165 being urged into engagement therewith by means of a spring 169 acting through a piston 168 which is mounted in the bore 162.

The casing section 142 has a passage 170 formed therein which communicates with the bore 162 at a point intermediate the valve disc 167 and the piston 168 when the valve disc is in position against the seat rib 165 and this passage communicates with the pipe 86 by way of a pipe 171.

The casing section 142 has a passage 173 formed therein which communicates with the bore 162 on the spring side of the piston 168 and with the chamber 160 and thereby with the crank case of the compressor. This permits lubricant which escapes past the piston 168 to the spring side of the piston to flow to the compressor crank case and prevents the building up of a pressure on the spring side of the piston which would interfere with movement of the piston.

The various parts of the system are shown in Fig. 2 of the drawings in the position which they assume when the equipment is idle, and the pressure of the fluid in the reservoir 4 is such that the force exerted by the fluid in the chamber 146 of the fluid pressure responsive device 16 is insufficient to move the diaphragm 144 against the opposing pressure of the spring 154, with the result that the valve disc 167 will be urged against the seat rib 165 by the spring 169 acting through the piston 168.

As the compressor 1 is idle the lubricant pump 14 will not supply any lubricant under pressure and no pressure will be developed in the chamber 100 in the control device 15, with the result that the piston 91 will be moved against the cap member 93 by the spring 95, acting through the plunger 96, and on movement of the plunger 96 to the position in which it is shown in the drawings, the throttle valve 10 will be moved to the engine idling position, which is the position in which it is shown in Fig. 1 of the drawings.

In addition on movement of the plunger 96 to the position in which it is shown in Fig. 2 of the drawings the shoulder 137 will be moved away from the forked end 136 of the lever 130, thereby permitting the spring 114 to move the valve element 112 into engagement with its seat and to move the valve element 122 out of engagement with its seat, thus cutting off communication between the chamber 111 and the chamber 116 and establishing communication between the chamber 116 and the atmosphere. This establishes communication between the atmosphere and the chamber 31 in the body 30 of the compressor inlet valve assembly 12 and permits the spring 36 to force the piston 32 downwardly so that the fingers 33 and 34 engage the annular rings 22 and 23 and move these away from the valve seat 21 against the springs 27, thereby unloading the compressor.

The engine 3 may now be started and it will drive the compressor causing the crank shaft 52 to rotate. The engine 3 may be started very readily as the compressor will be unloaded at this time and will offer very little resistance to the operation of the engine during the starting period.

On rotation of the crank shaft 52 of the compressor 1 the piston 50 of the pump 14 will be caused to reciprocate in the piston chamber 55, and at one point in its range of movement the lower end of the piston 50 is located above the inlet passage 70, and at another point in its range of movement the lower end of the piston is located below the inlet passage 70.

When the piston 50 moves to its upper position lubricant is drawn into the piston chamber 55 through the inlet passage 70, and when the piston moves downwardly it cuts off the inlet passage 70 leading to the chamber 55 and the lubricant in the chamber 55 is placed under pressure so that the ball valve element 64 is unseated and a portion of the oil in the chamber 55 flows through the passage 60 to the annular groove 61 in the eccentric 51, and therefrom through the passages in the crank shaft 52 to the portions thereof to be lubricated.

In addition a part of the lubricant in the chamber 55 is forced therefrom through the passage 75 and through the choke 84 to the passage 85 which has the pipe 86 communicating therewith. In the event that the pump supplies an excess of lubricant over that required by the crank shaft bearings and that required by the control apparatus, and the pressure exceeds the desired value, lubricant will be released through the pressure regulating valve 76.

Lubricant which is supplied to the pipe 86 flows therethrough to the pipe 171 and the passage 170, which leads to the bore 162 in the casing section 142 of the fluid pressure responsive device 16, and establishes a fluid pressure in this bore, which acts upon the valve disc 167 and tends to hold this disc in engagement with the seat rib 165.

Fluid which is supplied to the bore 162 through the passage 170 also acts upon the piston 168 and forces this piston to the right against the spring 169. The valve disc 167 will, therefore, be held against the seat rib 165 only by the fluid under pressure in the chamber intermediate the valve disc and the piston 168, but the pressure of this fluid is such that the force exerted by it on the valve disc 167 and tending to press the valve disc against the seat rib 165 is substantially greater than the force exerted on the valve disc 167 by the spring 169 when the valve disc is held against its seat by the spring.

Lubricant which is supplied to the pipe 86 also flows therethrough to the chamber 100 on the left hand side of the piston 91, and on a predetermined increase in the pressure of lubricant in this chamber, the piston 91 will be forced to the right, as viewed in Fig. 2 of the drawings, against the spring 95 acting through the plunger 96, and, as the piston 91 is moved, the plunger 96 will also be moved and will move the lever 103 so as to move the throttle valve 10 from the idling position to the load position.

The volume of the chamber 100 on the left hand side of the piston 91 is preferably relatively large, and the rate of supply of fluid thereto through the choke 84 and the pipe 86 is preferably relatively small, with the result that a substantial time interval is required for a sufficient amount of lubricant to be supplied to the chamber 100 to effect movement of the piston 91 against the spring 95 throughout the entire range of movement of the piston 91, which is required to move the throttle valve from the idling position to the load position, thus insuring that the throttle valve 10 will be opened slowly. This permits the engine to accelerate slowly and smoothly.

After the piston 91 has been moved a predetermined distance from the position in which it is shown in Fig. 2 of the drawings towards the right, and thereby has effected movement of the throttle valve 10 a predetermined amount from the idling position towards the load position, the shoulder 137 on the stem 96 will engage the forked end of the lever 130, and will cause this lever to pivot on the pin 132, with the result that the rounded end 134 of the lever 130 will press upon the valve element 122 and force this valve element into engagement with its seat and will cause the valve element 112 to be moved away from its seat against the spring 114.

When the valve element 122 is moved into engagement with its seat communication is cut off between the chamber 116 and the atmosphere, and when the valve element 112 is moved away from its seat communication is established between the engine inlet passage 9 and the pipe 45, which communicates with the chamber 31 in the inlet valve assembly 12 associated with the compressor cylinder.

A partial vacuum or region of reduced pressure will normally be present in the engine inlet passage 9, and a similar reduction in pressure will be effected in the chamber 31, and, assuming that a degree of vacuum or that the extent of the reduction in pressure below atmospheric pressure is equal to or substantially equal to that which is present during normal operation of the engine, will cause the piston 32 to move upwardly against the spring 36, with the result that the fingers 33 and 34 will be moved out of engagement with the annular rings 22 and 23 and these will be moved to their seats by the springs 28, thus effecting loading of the compressor.

As a result of operation of the compressor 1 the pressure of the fluid in the reservoir 4 will increase, and a similar increase will be effected in the chamber 146 of the fluid pressure responsive device 16, which chamber is in constant communication with the reservoir by way of the passage and pipe 148.

When the pressure of the fluid in the reservoir 4 and in the chamber 146 increases to a predetermined value, the force exerted by the fluid under pressure in the chamber 146 acting on the diaphragm 144 will be sufficient to move the diaphragm 144 and the plunger 150 against the spring 154, with the result that the end of the stem 152 will engage the valve disc 167, so that on further movement of the stem 152 the valve disc 167 will be moved away from the seat rib 165 against the pressure of the lubricant in the bore 162 acting on the valve disc, thus releasing fluid under pressure from the bore 162 to the chamber 160, from which it flows by way of the passage 161 to the crank case of the compressor 1.

On the release of fluid from the bore 162 the pressure of the fluid acting on the valve disc 167 and tending to hold this valve disc in engagement with the seat rib 165 will be reduced with the result that movement of the diaphragm 144 will be opposed only by the spring 154 and thereafter the valve disc 167 will be very rapidly moved away from the seat rib 165 by the stem 152 because of the reduction in the force opposing movement of the diaphragm 144. Fluid will thereupon be permitted to flow very rapidly from the bore 162 and the connecting passage 170 and pipe 171 to the chamber 160, and therefrom to the crank case chamber by way of the passage 161.

The release of fluid under pressure from the passage 170 and the pipe 171 results in a reduction in the pressure of the fluid in the pipe 86 and in the chamber 100 of the control device 15, as the rate at which fluid is released from the bore 162 substantially exceeds the rate at which fluid is supplied to the pipe 86 through the choke 84.

Upon a reduction in the pressure of the fluid in the chamber 100 the piston 91 will be forced to the left by the spring 95 acting through the plunger 96, the rate of movement of the piston 91 by means of the spring 95 being relatively rapid because of the relatively rapid rate at which fluid is released from the bore 162 past the seat rib 165.

On movement of the plunger 96 to the left, as viewed in Fig. 2 of the drawings, the throttle valve 10 will be moved from the load position to the idling position, while the shoulder 137 will be moved out of engagement with the forked end 136 of the lever 130 so that this lever no longer operates to hold the valve element 122 in engagement with its seat.

On the release of pressure from the lever 130 the spring 114 will urge the valve element 112 into engagement with its seat and the end of the stem associated with the valve element 112 presses on the stem of the valve element 122 and moves this valve away from its seat.

On movement of the valve element 112 into engagement with its seat communication between the engine inlet passage 9 and the chamber 31 in the inlet valve assembly 12 associated with the compressor cylinder will be cut off, while the chamber 31 will be connected to the atmosphere on movement of the valve element 122 away from its seat.

When the chamber 31 is connected to the atmosphere the spring 36 forces the piston 32 downwardly so that the fingers 33 and 34 move the annular rings 22 and 23 away from the valve seat 21 against the springs 27 so as to effect unloading of the compressor.

It will be seen, therefore, that on an increase to a predetermined value in the pressure of the fluid compressed by the compressor, the control system operates to unload the compressor and to move the throttle valve from the load position to the idling position so as to reduce the speed of the engine which drives the compressor.

The engine will continue to drive the compressor, which will not compress fluid into the reservoir 4 as the inlet valve is held in the open position, and upon a reduction in the pressure of the fluid in the reservoir 4 below a predetermined value, the pressure of the fluid in the chamber 146 will be insufficient to maintain the diaphragm 144 against the spring 154 with the result that this spring will force the plunger 150 to the left until the plate 155 engages the casing section 141. On movement of the plunger 150 to the left the stem 152 will also be moved to the left and will be moved out of engagement with the valve disc 167, thereby permitting this disc to be moved into engagement with the seat rib 165 by the spring 169 acting through the piston 168 and cutting off the release of fluid from the bore 162 and the connecting passage 170 and pipe 171 past the seat rib 165 to the chamber 160, and therefrom to the crank case chamber of the compressor by way of the passage 161.

The diaphragm 144 will not be moved against the pressure of the fluid in the chamber 146 until the pressure of the fluid in this chamber has reduced to a value substantially less than that which is effective to move the diaphragm 144 to unseat the valve 167 as the diaphragm will not be moved to the right as viewed in Fig. 2 of the drawings, until the pressure of the fluid in the chamber 146 has increased to a value such that the force exerted by the fluid acting on the diaphragm 144 is sufficient to overcome not only the spring 154, but also the force exerted by the fluid in the bore 162 acting on the valve disc 167 and tending to hold this disc in engagement with the seat rib 165 while the diaphragm 144 will not be moved to the left so as to permit the valve disc to seat until the pressure of the fluid in the chamber 146 has reduced to a value such that the force exerted by the fluid on the diaphragm 144 is insufficient to hold the diaphragm against the spring 154 and the relatively weak spring 169.

Upon movement of the valve disc 167 into engagement with the seat rib 165 the fluid which is supplied to the pipe 86 by operation of the lubricant pump 14 establishes a pressure in the pipe 86 and in the chamber 100 of the control device 15 causing the piston 91 to again move to the right against the spring 95 acting through the plunger 96, in the manner described in detail above, so as to again move the throttle valve 10 from the idling position to the load position, and to effect loading of the compressor so that the compressor again compresses fluid into the reservoir 4.

It will be seen that the control system provided by this invention provides means normally operative to maintain the compressor unloaded, together with means subject to and operated upon a predetermined reduction in the pressure of the fluid in the fuel inlet passage of the internal combustion engine employed to drive the compressor to actuate the unloading means to effect loading of the compressor.

It will be seen also that the control system provided by this invention provides means responsive to the pressure of the fluid compressed by the compressor and controlling the communication between the control means for the unloading means and the fuel inlet passage of the driving engine.

In addition, it will be seen that the control system provides means responsive to the speed of the compressor and controlling the communication between the engine inlet passage and the control means for the unloading means, so as to maintain the compressor unloaded during starting.

It will be seen also that the system provided by this invention incorporates means responsive to the pressure of the fluid compressed and operative to move the throttle valve of the engine from the idling position to the load position, this movement being effected relatively slowly so as to give the engine an opportunity to accelerate, and, in addition, has means to control the unloading means to effect loading of the compressor, this means being operable only after the throttle valve has been moved a predetermined distance from the idling position towards the load position.

While one embodiment of the control system provided by my invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In combination, an internal combustion engine having a fuel intake passage, and a throttle valve for controlling communication through said fuel intake passage, a fluid compressor driven by said engine and having unloading means associated therewith, control means for the unloading means comprising an abutment subject on one side to the pressure of the fluid in a chamber, valve means controlling communication between said chamber and the fuel intake passage, and means responsive to the pressure of fluid compressed by the compressor for controlling said valve means and for controlling the throttle valve.

2. In combination, an internal combustion engine having a fuel intake passage, and a throttle valve for controlling communication through said fuel intake passage, a fluid compressor driven by said engine and having unloading means associated therewith, control means for the unloading means comprising an abutment subject on one side to the pressure of the fluid in a chamber, valve means controlling communication between said chamber, and the fuel intake passage, and means responsive to the speed of the compressor for controlling said valve means and the throttle valve.

3. In combination, an internal combustion engine having a fuel intake passage, and a throttle valve for controlling communication through said fuel intake passage, a fluid compressor driven by said engine and having unloading means associated therewith, control means for the unloading means comprising an abutment subject on one side to the pressure of the fluid in a chamber, valve means controlling communication between said chamber and the fuel intake passage, and means responsive to the speed of the compressor and to the pressure of the fluid compressed by the compressor for controlling the said valve means and the throttle valve.

4. In combination, a fluid compressor having unloading means associated therewith, control means for the unloading means comprising an abutment subject on one side to the pressure of the fluid in a chamber, an internal combustion engine for driving said compressor and having a fuel intake passage, a throttle valve controlling the flow of fluid through said fuel intake passage, the throttle valve having an idling position and a load position, valve means controlling communication between said chamber and said fuel intake passage, and thereby controlling loading and unloading of the compressor, and means responsive to the pressure of fluid compressed by the compressor and operable upon a reduction in the pressure of the said fluid to a predetermined value to move the throttle valve from the idling position to the load position and to control operation of the valve means to effect loading of the compressor.

5. In combination, a fluid compressor having unloading means associated therewith, control means for the unloading means comprising an abutment subject to and operated upon a predetermined reduction in the pressure of the fluid in a chamber on one side thereof, an internal combustion engine for driving said compressor and having a fuel intake passage, a throttle valve controlling the flow of fluid through said fuel intake passage, the throttle valve having an idling position and a load position, valve means controlling communication between said chamber and said fuel intake passage, means responsive to the pressure of the fluid compressed by the compressor and operable upon a reduction in the pressure of the said fluid to a predetermined value to move the throttle valve from the idling position to the load position and to move the valve means to a position to permit communication between the chamber and the fuel intake passage and thereby effect loading of the compressor, said valve means being moved to said position only after the throttle valve is moved to a point adjacent its load position.

6. In combination, a fluid compressor having unloading means associated therewith, a lubricating system adapted to supply lubricant under pressure to said compressor, an internal combustion engine for driving said compressor, the engine having a throttle valve associated therewith for controlling the supply of fuel thereto, said throttle valve having an idling position and a load position, movable abutment means subject to and operated on a predetermined increase in the pressure of the fluid supplied thereto to move the throttle valve from the idling position to the load position and to actuate the unloading means to effect loading of the compressor, means for supplying lubricant from the compressor lubricating system to said movable abutment means, and means responsive to the pressure of the fluid compressed by the compressor and controlling the pressure of the lubricant supplied to said movable abutment means.

7. In combination, a fluid compressor having unloading means associated therewith, a liquid circulating system operated in accordance with the speed of the compressor, an internal combustion engine for driving the compressor, the engine having a fuel supply device associated therewith for varying the quantity of fuel supplied to the engine, a movable member for adjusting said fuel supply device between an engine idling condition and an engine load condition and for actuating said compressor unloading means, yielding means opposing movement of said member to the position to adjust the fuel supply device to the load condition and to effect loading of the compressor, movable abutment means operated on the supply of fluid thereto to move said member against said yielding means, and means subject to the opposing pressures of the fluid compressed by the compressor and of the fluid supplied to said movable abutment means and controlling the supply of liquid from the liquid circulating system to said movable abutment means.

8. In combination, a fluid compressor having unloading means associated therewith, a liquid circulating system operated in accordance with the speed of the compressor, an internal combustion engine for driving the compressor, the engine having a fuel supply device associated therewith for varying the quantity of fuel supplied to the engine, a movable member for adjusting said fuel supply device between an engine idling condition and an engine load condition and for actuating said compressor unloading means, yielding means opposing movement of said member to the position to adjust the fuel supply device to the load condition and to effect loading of the compressor, movable abutment means operated on an increase in the pressure of fluid supplied thereto to move said member against said yielding means, means for supplying liquid from the liquid circulating system to said movable abutment means at a restricted rate, and means subject to the pressure of the fluid compressed by the compressor for controlling the pressure of the liquid supplied to said movable abutment means.

9. In combination, a fluid compressor having unloading means associated therewith, a liquid circulating system operated in accordance with the speed of the compressor, an internal combustion engine for driving the compressor, the engine having a fuel supply device associated therewith for varying the quantity of fuel supplied to the engine, a movable member for adjusting said fuel supply device between an engine idling condition and an engine load condition and for actuating said compressor unloading means, yielding means opposing movement of said member to the position to adjust the fuel supply device to the load condition and to effect loading of the compressor, movable abutment means operated on an increase in the pressure of fluid supplied thereto to move said member against said yielding means, means for supplying liquid from the liquid circulating system to said movable abutment means at a restricted rate, and means subject to the opposing pressures of the fluid compressed by the compressor and of the liquid acting on said movable abutment means for controlling the pressure of the liquid supplied to said movable abutment means.

10. In combination, a fluid compressor, an internal combustion engine for driving the compressor, said engine having a fuel inlet passage, and unloading means for the compressor comprising a movable abutment subject to the pressure of the fluid in a chamber, said unloading means being operative to effect loading of the compressor on a reduction in the pressure of the fluid in said chamber substantially to the value of the fluid present in the engine inlet passage when the engine is operating in the normal manner, said unloading means being operative to effect unloading of the compressor on an increase in the pressure of the fluid in said chamber to a value higher than that present in the engine inlet passage when the engine is functioning in the normal manner.

11. In combination, a fluid compressor, an internal combustion engine for driving the compressor, said engine having a fuel inlet passage, and unloading means for the compressor comprising a movable abutment subject to the pressure of the fluid in a chamber, said unloading means being operative to effect loading of the compressor on a reduction in the pressure of the fluid in said chamber substantially to the value of the fluid present in the engine inlet passage when the engine is operating in the normal manner, said unloading means being operative to effect unloading of the compressor on an increase in the pressure of the fluid in said chamber to a value higher than that present in the engine inlet passage when the engine is functioning in the normal manner, and means responsive to the pressure of the fluid compressed by the compressor for establishing communication between said chamber and said engine inlet passage.

12. In combination, a fluid compressor, an internal combustion engine for driving the compressor, said engine having a fuel inlet passage, and unloading means for the compressor comprising a movable abutment subject to the pressure of the fluid in a chamber, said unloading means being operative to effect loading of the compressor on a reduction in the pressure of the fluid in said chamber substantially to the value of the fluid present in the engine inlet passage when the engine is operating in the normal manner, said unloading means being operative to effect unloading of the compressor on an increase in the pressure of the fluid in said chamber to a value higher than that present in the engine inlet passage when the engine is functioning in the normal manner, a lubricating system for supplying lubricant under pressure to said compressor, and means responsive to the pressure of the lubricant in said system for establishing communication between said chamber and the engine inlet passage.

13. In combination, a fluid compressor, an internal combustion engine for driving the compressor, said engine having a fuel inlet passage, and unloading means for the compressor comprising a movable abutment subject to the pressure of the fluid in a chamber, said unloading means being operative to effect loading of the compressor on a reduction in the pressure of the fluid in said chamber substantially to the value of the fluid present in the engine inlet passage when the engine is operating in the normal manner, said unloading means being operative to effect unloading of the compressor on an increase in the pressure of the fluid in said chamber to a value higher than that present in the engine inlet passage when the engine is functioning in the normal manner, and means operative upon attainment of effective speed by the compressor for establishing communication between said chamber and the engine inlet passage.

BURTON S. AIKMAN.